United States Patent
Kumar et al.

(10) Patent No.: US 6,658,118 B1
(45) Date of Patent: Dec. 2, 2003

(54) SUPPRESSION OF FLUID-BORNE NOISE

(75) Inventors: Satyendra Kumar, Troy, MI (US); Devendra Kumar, Rochester Hills, MI (US); Michael J. Dougherty, Rochester Hills, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 09/445,373

(22) PCT Filed: Jun. 5, 1998

(86) PCT No.: PCT/US98/11738
§ 371 (c)(1),
(2), (4) Date: Dec. 6, 1999

(87) PCT Pub. No.: WO98/55060
PCT Pub. Date: Dec. 10, 1998

(51) Int. Cl.[7] ................................................. A61F 11/06
(52) U.S. Cl. ...................................... 381/71.1; 181/206
(58) Field of Search ............................... 381/71.1, 71.2, 381/71.5, 71.7, 94.2; 181/206, 233, 234, 220, 221, 237, 259, 260, FOR 124, FOR 123

(56) References Cited

U.S. PATENT DOCUMENTS

| | | | |
|---|---|---|---|
| 3,678,453 A | * 7/1972 | Horwath | |
| 4,715,559 A | * 12/1987 | Fuller | 381/71 |
| 4,903,249 A | * 2/1990 | Hoops et al. | 367/140 |
| 4,947,434 A | * 8/1990 | Ito | 381/71 |
| 5,493,615 A | * 2/1996 | Burke et al. | 381/71 |
| 5,497,043 A | * 3/1996 | Leung et al. | 310/328 |
| 5,668,744 A |   9/1997 | Varadan et al. | |

OTHER PUBLICATIONS

S. Kumar, "Smart Ceramics for Broadband Vibration Control" J. Intelligent Material Systems and Structures, vol. 5, Sep. 1994, pp. 673–677.
H.B. Strock, "Emerging Smart Materials Systems: Technologies, Applications and Market Opportunities" (1995).
S. Kumar, "Smart Materials for Acoustic or Vibration Control" (Aug. 1991).
Y. Nishizawa, "Electronic Control Canceling System for a Disc Brake Noise" SAE No. 971037 (1997).
L. Brooke, "Smart Materials" (Sep. 1996).

* cited by examiner

*Primary Examiner*—Duc Nguyen
*Assistant Examiner*—Lun-See Lao
(74) *Attorney, Agent, or Firm*—Reising, Ethington, Barnes, Kisselle, P.C.

(57) ABSTRACT

Apparatus for suppressing fluid-borne noise in a fluid conduit (12 or 12*a*) that includes a vibration sensor (36, 36*a* or 36*b*) for operative coupling to the conduit for providing an electrical sensor signal as a function of fluid pressure fluctuations in the conduit. A piezoelectric actuator (40, 40*a* or 40*b*) is adapted to be mounted on the conduit for imparting pressure fluctuations to fluid in the conduit. An electronic controller (38, 38*a* or 38*b*) is responsive to the sensor signal for energizing the actuator 180° out of phase with fluid pressure fluctuations sensed by the sensor. The sensor may be either closely coupled to the actuator, or separate from the actuator and disposed upstream of the actuator with respect to the direction of fluid flow through the conduit. The sensor in the preferred embodiments of the invention comprises a piezoelectric sensor, and the actuator comprises a stack of piezoelectric elements.

9 Claims, 3 Drawing Sheets

SUPPRESSION OF FLUID-BORNE NOISE

The present invention is directed to suppression of fluid-borne noise in fluid handling systems, such as in automotive power steering, power brake, fuel and air conditioning systems.

BACKGROUND AND OBJECTS OF THE INVENTION

There are many applications in commerce and industry in which it is desirable to suppress fluid-borne noise in fluid handling systems. For example, in automotive applications, it is desirable to suppress fluid-borne noise generated by the pump or load in power steering, fuel distribution, air conditioning and power brake fluid systems. It is also desirable to suppress compressor noise in domestic and commercial air conditioning systems. Fluid-borne noise can also be a problem in industrial hydraulic applications in terms of both generation of audible noise, and wear and fatigue of system components.

Kumar, "Smart Materials For Acoustic or Vibration Control." Pennsylvania State University (1991) teaches that fluid-borne noise within a metal tube can be suppressed by positioning a piezoelectric actuator at one end of the fluid tube. The piezoelectric actuator is disposed between an aluminum block that is affixed to the tube and an aluminum block that is coupled to a rubber membrane in contact with the fluid. A sensor is disposed between the actuator and the membrane block, and is coupled through a frequency selective preamplifier, a phase shifter and an amplifier for energizing the piezoelectric actuator 180° out of phase with the predominant frequency of vibration within the fluid.

Although the subject matter taught by the Kumar thesis addresses problems theretofore extant in the art, further improvements remain desirable. For example, an important consideration in high-volume applications, such as automotive applications, is that the unit be economical to manufacture and reliable over an extended operating lifetime. One object of the present invention is to provide a system and method that satisfy these objectives. Another object of the present invention is to provide a system and method of fluid-borne noise suppression in which a single unit configuration can be employed in a variety of applications. For example, in one implementation of the invention, it is an objective of the invention to provide a system and method for suppression of fluid-borne noise in automotive power steering systems in which a single unit design can be employed in conjunction with a wide variety of power steering systems. Another object of the present invention is to provide a system and method that are characterized by low power consumption.

SUMMARY OF THE INVENTION

Apparatus for suppressing fluid-borne noise in a fluid conduit in accordance with the various preferred embodiments of the invention includes a vibration sensor for operative coupling to the conduit for providing an electrical sensor signal as a function of fluid pressure fluctuations in the conduit. A piezoelectric actuator is adapted to be mounted on the conduit for imparting pressure fluctuations to fluid in the conduit. An electronic controller is responsive to the sensor signal for energizing the actuator 180° out of phase with fluid pressure fluctuations sensed by the sensor. The sensor may be either closely coupled to the actuator, or separate from the actuator and disposed upstream of the actuator with respect to the direction of fluid flow through the conduit. The sensor in the preferred embodiments of the invention comprises a piezoelectric sensor, and the actuator comprises a stack of piezoelectric elements.

The electronic control unit is responsive to frequency components of pressure fluctuations of fluid in the conduit for energizing the actuator as a function of the amplitude of the frequency component of greatest amplitude. The sensor is responsive to fluid pressure fluctuations in the conduit over a broad frequency range, much lower than the resonant frequencies of the sensor and actuator. The frequency range in the preferred embodiments of the invention preferably is from zero to at least 1000 hertz.

A fluid handling system in accordance with another aspect of the present invention includes a conduit for conducting fluid under pressure and an apparatus of the character described above for suppressing fluid-borne noise caused by fluid pressure fluctuations in the conduit. In various embodiments of the invention, the conduit includes a volumetric enlargement to which the sensor and actuator are coupled, or a right-angled turn at which the sensor and actuator are disposed in opposition to fluid flowing through the conduit. In another embodiment of the invention, the actuator comprises a plurality of annular discs disposed within the conduit in such a way that fluid flows through the discs. The sensor is either closely coupled to the actuator, or is separate from the actuator and disposed upstream of the actuator with respect to the direction of fluid flow through the conduit. In one preferred embodiment of the invention, the conduit includes an opening, and the noise suppression apparatus of the invention is disposed in a unitary assembly removably received in the opening.

In accordance with yet another aspect of the present invention, a method of suppressing fluid-borne noise caused by pressure fluctuations in fluid flowing through a conduit includes sensing the amplitude and frequency components of pressure fluctuations in the conduit, and energizing a piezoelectric actuator as a function of the amplitude and frequency components so as to impart pressure fluctuations to fluid in the conduit. The actuator preferably is energized as a function of the frequency component of greatest amplitude, 180° out of phase with such frequency component.

BRIEF DESCRIPTION OF THE DRAWINGS

The invention, together with additional objects, features and advantages thereof, will be best understood from the following description and the accompanying drawings in which.

DETAILED DESCRIPTION OF PREFERRED EMBODIMENTS

Figure 1:
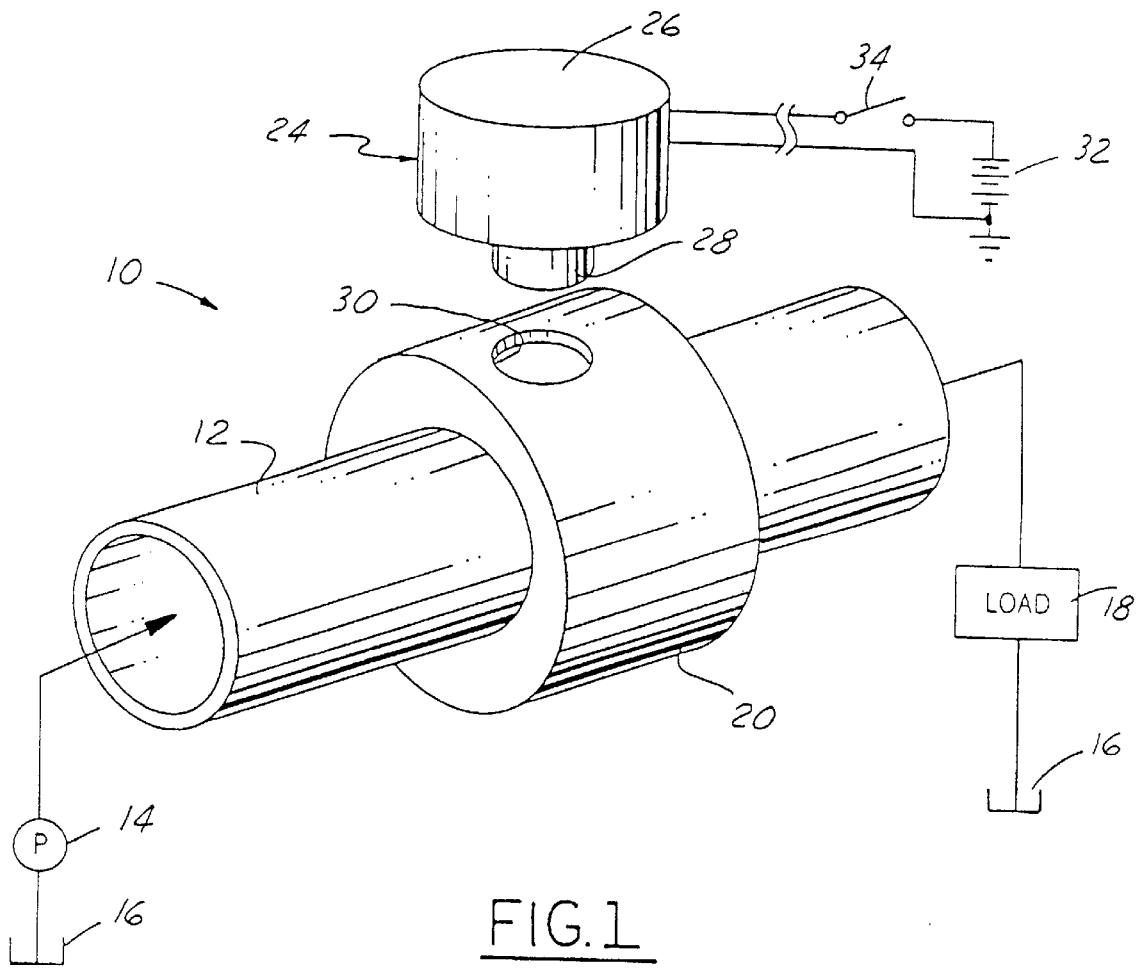
FIG. 1 is a schematic diagram of a fluid handling system equipped with a fluid-borne noise suppression apparatus in accordance with the present invention.
Figure 2:
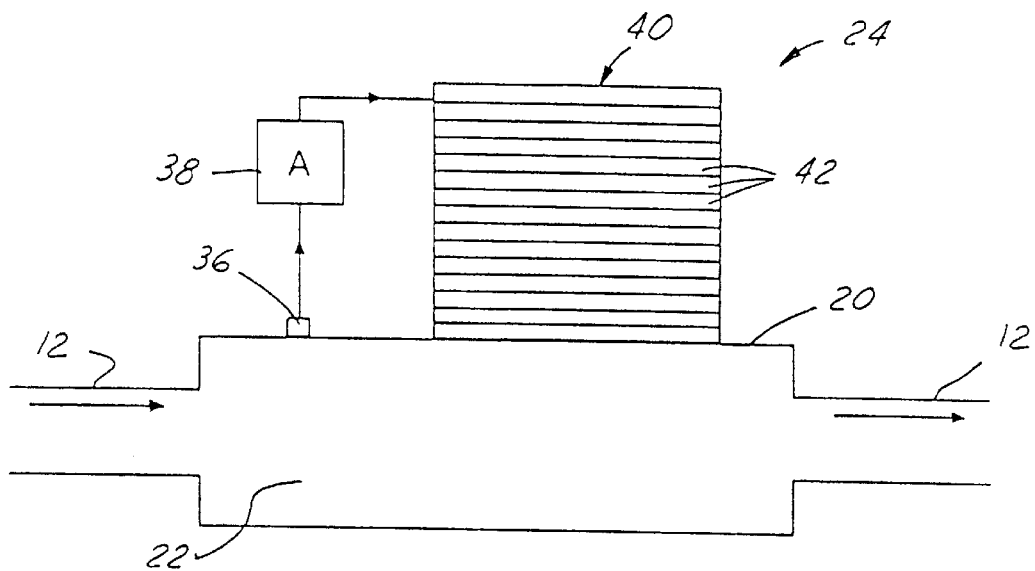
FIG. 2 is a schematic diagram of the noise suppression apparatus of FIG. 1.
Figure 3:
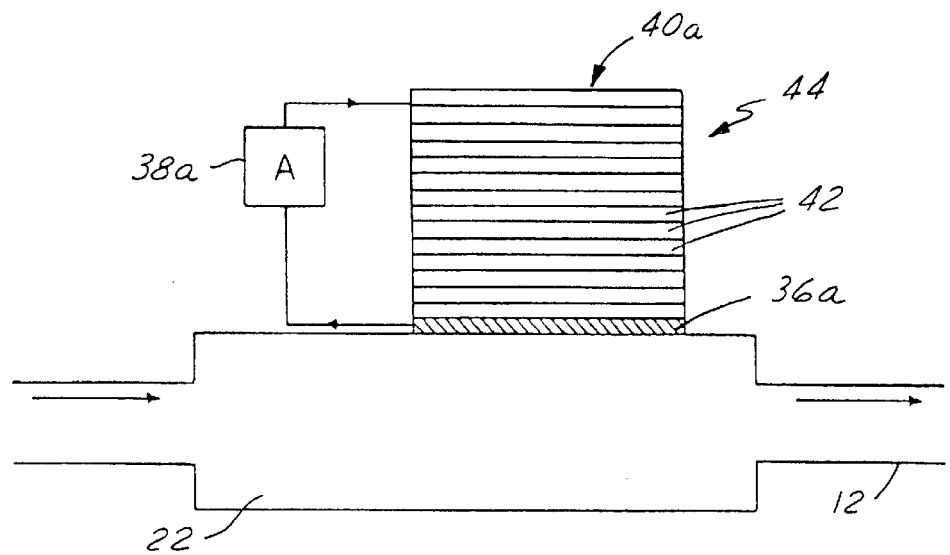
FIGS. 3, 4, 5 and 6 are schematic diagrams of respective modified embodiments of the invention.

FIG. 1 illustrates a fluid handling system 10 in accordance with one implementation of the present invention as comprising a tubular section of conduit 12 that receives fluid at one end from a pump 14 and a sump 16, and delivers fluid from the opposing end through a load 18 to sump 16. Conduit 12 may be of any suitable composition. A collar 20 of low carbon steel or other suitable composition is affixed to conduit 12 between its opposed ends. As best seen in FIG. 2, collar 20 cooperates with conduit 12 to form a fluid volume 22 of enlarged diameter as compared with the diameter of conduit 12. An electronic assembly 24 has a case 26 with a plug 28 at one end adapted to be removably received within an opening 30 on collar 20. For example, plug 28 may contain external threads for removable receipt within internally threaded opening 30. Alternatively, plug 20 and opening 30 may contain suitable fittings for quarter-turn mounting within the collar opening. Electronic assembly 24 is coupled to a source 32 of electrical power, preferably through a switch 34 for selectively applying power to assembly 24 during periods of use. For example, switch 34 may be associated with an automobile power system for applying electrical power to assembly 24 during periods when the vehicle is in use.

Referring to FIG. 2, electronic assembly 24 in this embodiment of the invention includes a vibration sensor 36 that provides an input signal to a broad-band amplifier 38 as a function of fluid-borne vibration within area 22 of fluid conduit 12. The output of amplifier 38 is coupled to a piezoelectric actuator 40, which may comprise a stack of individual piezoelectric disks 42 as shown. Sensor 36 provides to amplifier 38 a signal having one or more frequency components associated with the frequency components of vibrations carried by fluid flowing through collar 20. Amplifier 38 is automatically responsive to the signal from sensor 36 for energizing actuator 40 as a function of the amplitude of the highest-amplitude frequency component of the input signal from sensor 36. Thus, actuator 40 is energized in direct proportion to the noise signal component of highest amplitude. Furthermore, amplifier 38 shifts such frequency component 180°, so that actuator 40 is energized 180° out of phase with the selected noise component. Thus, simply stated, actuator 40 imparts vibrations to the fluid within collar volume 20 at a frequency and magnitude to cancel or suppress the fluid-borne vibration wavelength of highest magnitude. Enlarged volume 22 enlarges the fluid surface area available for actuator 40. Sensor 36 and actuator disks 42 may be of any suitable composition, such as lead-zinc-titanate or modified lead-titanate. Piezoelectric actuators have several advantages including precision displacement, generation of large forces, extremely fast response, and high input impedance requiring low drive power. Amplifier 38, illustrated functionally in the drawings, may comprise simple analog circuitry, or digital circuitry based upon individual component or microprocessor control. Microprocessor-based control can employ fuzzy logic or neural network technology, if desired.

It will be appreciated, of course, that actuator 40 need not be disposed at a position directly opposite to the direction of fluid flow. The noise vibrations within the fluid create hydrostatic pressure pulses in all directions. Furthermore, a single sensor 36, broadband amplifier 38 and actuator 40 may be employed in a variety of applications in which fluid-borne noise is generally within the same frequency range. For example, fluid-borne noise in automotive power steering applications can be expected to be within the range of about 0 to 1000 Hz regardless of manufactures or model. This is well below the resonant frequency of typical sensors 36 and actuators 40. A single broadband system or unit, designed to operate at pressures up to 1500 psi at 200° F. may thus be employed for all models. The same is true for various manufacturers and models of automotive air conditioning systems, automotive power brake systems, and automotive fuel delivery systems. In connection with power brake systems in particular, the invention may be employed to suppress fluid vibrations associated with pulsed operation of anti-skid brake systems, which many drivers do not care to feel at the vehicle brake pedal.

Figure 4:
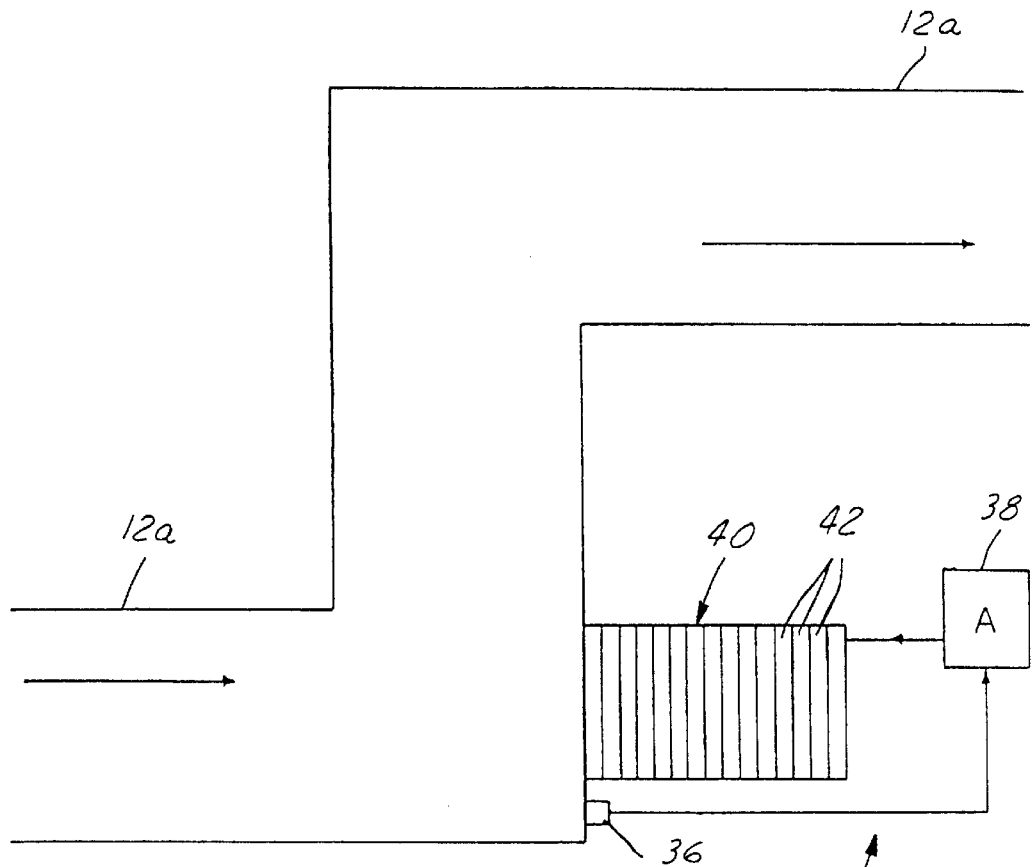
Figure 5:
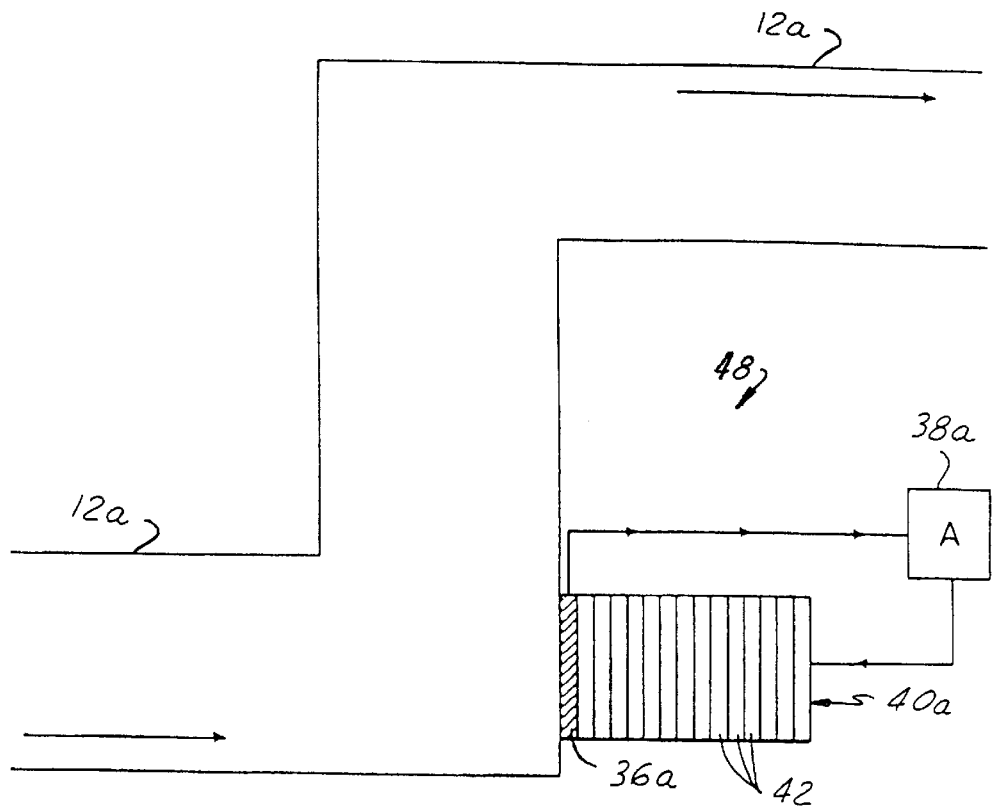

FIGS. 3–6 illustrate various modified embodiments of the invention, in which like reference numerals indicate like components, and like reference numerals with a letter suffix indicate related components. In the system 44 of FIG. 3, sensor 36a is formed as part of piezoelectric actuator 40a, and thus is closely coupled to the actuator during operation. To reduce coupling between actuator 40a and sensor 36a, the sensor material should have a low planar coupling coefficient (such as modified lead titanate), and sensor thickness should be such that its resonant frequency is in the megahertz range. In the system 46 of FIG. 4, the noise vibration electronics is disposed at a right-angle bend in fluid conduit 12a, so that the actuator is approximately axially opposed to the direction of fluid flow. Sensor 36 in FIG. 4 is separate from actuator 40, while sensor 36a in system 48 of FIG. 5 is again closely coupled to actuator 40a.

Figure 6:
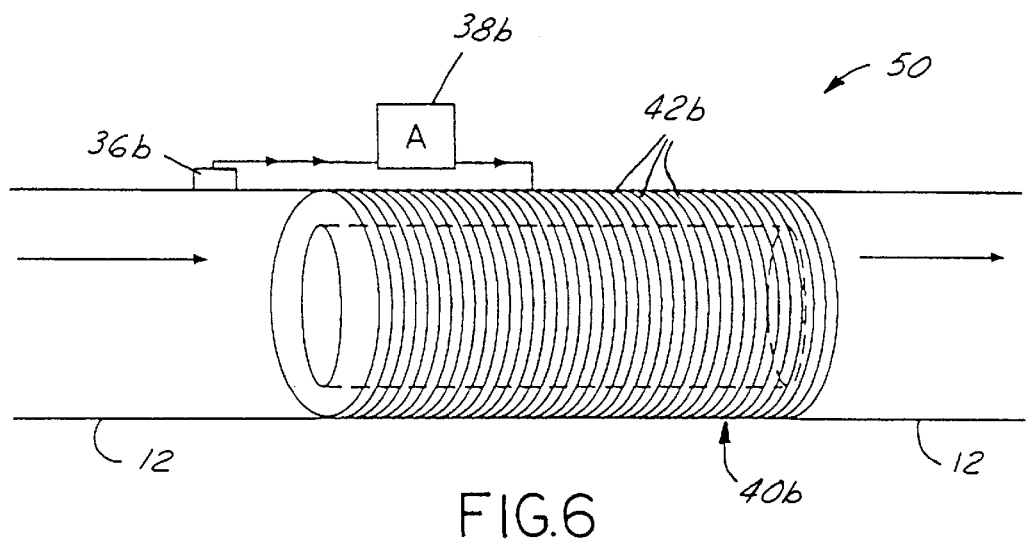

In system 50 in FIG. 6, piezoelectric actuator 40b is disposed within conduit 12, and is composed of a plurality of annular disks 42b stacked with respect to each other so that the direction of flexure is parallel to the direction of fluid flow through conduit 12. Vibration sensor 36 is coupled to conduit 12 upstream of actuator 40b, and operates through an amplifier 38b to energize actuator 40b 180° out of phase with the highest-amplitude frequency component of the vibrations sensed at sensor 36b. Fluid flows through the hollow interior of actuator 40b formed by the aligned openings of the multiple annular disks 42b.

In one implementation of the present invention in an automotive power steering system and based upon the embodiment of FIG. 2, fluid pressure fluctuations were monitored with PCB Dynamic Pressure Transducers (Type 101A02). The pressure fluctuations were first recorded without any signal being applied to piezoelectric actuator 40. Frequency analysis of this signal was carried out by a Hewlett-Packard Dynamic Signal Analyzer (Model 3562A). To reduce pressure fluctuations or ripple, a phase-shifted pressure field was applied to the hydraulic fluid employing actuator 40. The pressure ripple was again recorded with the Dynamic Pressure Transducer, and frequency analysis was carried out. The amplitudes of the pressure ripples associated with different frequency components observed under these two operating conditions—first without and then with actuation of piezoelectric actuator 40—were compared to each other. The following table shows a typical set of data for selected dominant frequencies:

| Frequency of pressure ripple (Hz) | Pressure ripple without control (psi) | Pressure ripple with control (psi) |
| --- | --- | --- |
| 332.5 | 0.209 | 0.137 |
| 665 | 0.864 | 0.184 |
| 997.5 | 0.122 | 0.052 |
| 1330 | 0.370 | 0.137 |

It can be seen from the tabulated data that all four frequencies in the pressure ripple were reduced in amplitude. This demonstrates the broadband nature of the invention. In contrast to passive-type pressure-ripple attenuation systems that are sensitive to ripple frequency, the system of the present invention reduces pressure ripples of all frequencies within the given bandwidth. Thus, if one or all of the frequencies were to shift for some reason, their amplitudes would still be reduced by the active attenuation technique of the present invention. The frequency of highest amplitude in this test was at 665 Hz. The amplitude of the pressure fluctuations was reduced by a factor of five at this dominant frequency. The system is effective at low static pressures as well as high static pressures, as on the order of 1500 psi.

What is claimed is:

1. Apparatus for suppressing fluid-borne noise, which includes:

a fluid conduit having a conduit wall with an interior surface and a lateral opening through said wall, and an electronic assembly that includes a case with an extending plug, said plug being removably received in said conduit opening such that an end face of said plug is parallel to said interior surface of said wall and said case is outside of said conduit, said electronic assembly including a vibration sensor and a piezoelectric actuator for communication through said plug with the interior of said conduit, and an electronic controller in said housing responsive to signals from said sensor for energizing said actuator to suppress fluid-borne pressure fluctuations in said conduit.

2. The apparatus set forth in claim 1 wherein said piezoelectric actuator includes a stack of piezoelectric disks.

3. The apparatus set forth in claim 2 wherein said vibration sensor is a piezoelectric disk at an end of said stack adjacent to the interior of said conduit.

4. The apparatus set forth in claim 3 wherein said conduit includes a volumetric enlargement in which said lateral opening is disposed.

5. The apparatus set forth in claim 4 wherein said enlargement extends around said conduit.

6. The apparatus set forth in claim 1 wherein said conduit includes a volumetric enlargement in which said lateral opening is disposed.

7. Apparatus for suppressing fluid-borne noise in a conduit having a conduit wall with an interior wall surface and a lateral opening, said apparatus including:

an electronic assembly having a case with an extending plug, said plug being adapted to be removably received in the conduit opening such that an end face of said plug is parallel to an interior surface of the conduit wall and said case is disposed outside of the conduit, said electronic assembly including a vibration sensor and a piezoelectric actuator for communication through said plug with the interior of the conduit, and an electronic controller in said case and responsive to signals from said sensor for energizing said actuator to suppress fluid-borne pressure fluctuations in the conduit.

8. The apparatus set forth in claim 7 wherein said piezoelectric actuator includes a stack of piezoelectric disks.

9. The apparatus set forth in claim 8 wherein said vibration sensor is a piezoelectric disk at an end of said stack remote from said case.

* * * * *